United States Patent [19]

Reynolds

[11] Patent Number: 4,625,625
[45] Date of Patent: Dec. 2, 1986

[54] VEHICLE HYDRAULIC SYSTEMS

[75] Inventor: Desmond H. J. Reynolds, West Midlands, England

[73] Assignee: Lucas Industries Public Limited Company, England

[21] Appl. No.: 603,123

[22] Filed: Apr. 23, 1984

[30] Foreign Application Priority Data

Apr. 30, 1983 [GB] United Kingdom ............... 8311933

[51] Int. Cl.$^4$ .............................................. F15B 9/10
[52] U.S. Cl. ..................................... 91/378; 60/547.3; 91/450; 91/532
[58] Field of Search ................. 60/547.1, 547.2, 547.3, 60/553; 91/31, 372, 376 R, 378, 422, 436, 516, 532, 450

[56] References Cited

U.S. PATENT DOCUMENTS

| 3,677,002 | 7/1972 | Fulmer | 60/547.3 |
|---|---|---|---|
| 4,135,435 | 1/1979 | Adachi | 91/378 |
| 4,196,592 | 4/1980 | Nomura | 91/31 |
| 4,338,855 | 7/1982 | Ideta | 91/31 |
| 4,373,424 | 2/1983 | Adachi | 91/31 |
| 4,420,934 | 12/1983 | Udono | 91/31 |
| 4,423,598 | 1/1984 | Ideta | 60/547.3 |
| 4,467,700 | 8/1984 | Udono | 60/547.3 |
| 4,468,927 | 9/1984 | Farr | 91/378 |

Primary Examiner—Abraham Hershkovitz
Attorney, Agent, or Firm—Oldham, Oldham & Weber Co.

[57] ABSTRACT

In a vehicle hydraulic system of the open center kind, hydraulic fluid for operating vehicle services is circulated continuously, normally by an engine-driven pump. A closed center booster which requires a substantially constant pressure differential to operate it, is included in the open center system, the pressure differential being provided by a fixed restriction. The fixed restriction may be operative when the pump is operative, or only when the booster is operative. The booster is arranged so that in operation, high pressure fluid entering a boost chamber displaces an equal volume of fluid from a forward chamber into the system. The booster may also include a one-way valve allowing flow of fluid from the forward chamber to the boost chamber.

6 Claims, 3 Drawing Figures

VEHICLE HYDRAULIC SYSTEMS

This invention relates, in one of its aspects, to vehicle hydraulic systems of the open centre kind, in which hydraulic fluid for operating vehicle services is circulated continuously.

The vehicle services may include an hydraulic booster for a clutch or braking system, power steering and, in the case of agricultural or similar vehicles, various implements. An engine-driven pump is normally employed to circulate the fluid. It is an advantage for the services to be arranged so that operation of one service affects the others as little as possible, and so that the capacity of the pump can be minimised, as this reduces the fuel consumed by the engine, and the heat which must be dissipated by the system when the pump is operating. It may be difficult to arrange the booster to achieve this, however. For example, if the booster is of the open centre type continuous fluid flow through the booster is required, and the restriction of flow to provide the pressure to operate the booster may affect the other services. The booster may instead be of the closed centre type, so that continuous fluid flow through the booster is not required, but a substantially constant pressure differential is required for operating the booster. Thus in one known system of the kind set forth, the pressure differential for operating a closed centre booster is provided by an accumulator, which requires a greater pump capacity if the accumulator is to be charged at the same time that the other services are being used.

According to one aspect of our invention, an open centre vehicle hydraulic system of the kind set forth includes a pump for circulating the fluid, and a closed centre booster, a pressure differential for operating the booster being provided by a fixed restriction in the system.

This has the advantage of providing a closed centre booster in the system without also requiring an accumulator, which helps in keeping the pump capacity to a minimum.

The fixed restriction is preferably incorporated in the booster. It may be operative to generate the pressure differential as long as the pump is operative. Alternatively, the fixed restriction may be operative to generate the pressure differential only when the booster is operative, which helps in reducing the heat generated in the system. In this case, the fixed restriction is operative in response to movement of an input piston of the booster.

When it is inoperative the booster is preferably suspended at the pressure obtaining on the lower pressure side of the fixed restriction.

Preferably, the booster is constructed and arranged so that in operation a volume of fluid at a higher pressure entering the booster from the system causes an equal volume of fluid at a lower pressure to leave the booster and return to the system. This results in ths booster consuming a negligible amount of fluid, which means that the effect of its operation on the other services, and the capacity of the pump, can be minimised.

Furthermore, such a closed centre booster may easily be incorporated in an existing system of the kind set forth, firstly because it does not require extra pump capacity, and will not affect operation of the other services, and secondly because the system needs no other modification.

A further aspect of the present invention relates to an hydraulic booster of the kind (hereinafter called "the kind referred to") comprising a housing provided with a bore, an inlet for connection to a source of fluid pressure and an outlet for connection to a reservoir for fluid, an input piston to which an input force is applied, and a boost piston for augmenting an output force working in the bore, the boost piston being advanced in the bore in response to pressurisation of a boost chamber defined in the bore behind the boost piston, pressurisation of the boost chamber being controlled by control valve means operative to control communication of the boost chamber with the inlet and the outlet in response to the input force.

In known boosters of the kind referred to, movement of the boost piston, in response to the pressurised fluid from the source admitted to the boost chamber, displaces fluid to the outlet from a chamber forward of the boost piston. If the source of pressure fails, or the pressure is reduced, the booster is operated mechanically, and if this operation is rapid, the pressure of the fluid in the forward chamber may exceed the pressure of the fluid in the boost chamber, which adversely affects the operation of the booster.

According to the further aspect of our invention, an hydraulic booster of the kind referred to has a chamber forward of the boost piston from which fluid is displaced to the outlet as the boost piston is advanced in response to fluid pressure from the source admitted to the boost chamber, and a connection between the forward chamber and the boost chamber incorporates a one-way valve allowing fluid to flow from the forward chamber to the boost chamber.

Thus, if the pressure in the forward chamber exceeds that in the boost chamber, fluid can be transferred from the forward chamber to the boost chamber so that the mechanical operation of the booster is not adversely affected.

A booster according to this further aspect of our invention may advantageously be used where the source of pressure is unreliable or does not always provide sufficient volumetric flow for operating the booster.

The one-way valve is conveniently located in a passage in the boost piston connecting the forward and boost chambers.

Preferably, the volume of fluid displaced from the forward chamber to the outlet as the boost piston advances is substantially equal to the volume of fluid admitted to the boost chamber from the source.

Embodiments of the aspects of our invention are illustrated in the accompanying drawings, in which FIG. 1 is a schematic outline of an open centre vehicle hydraulic system in accordance with the first aspect of our invention;

Figure 1:
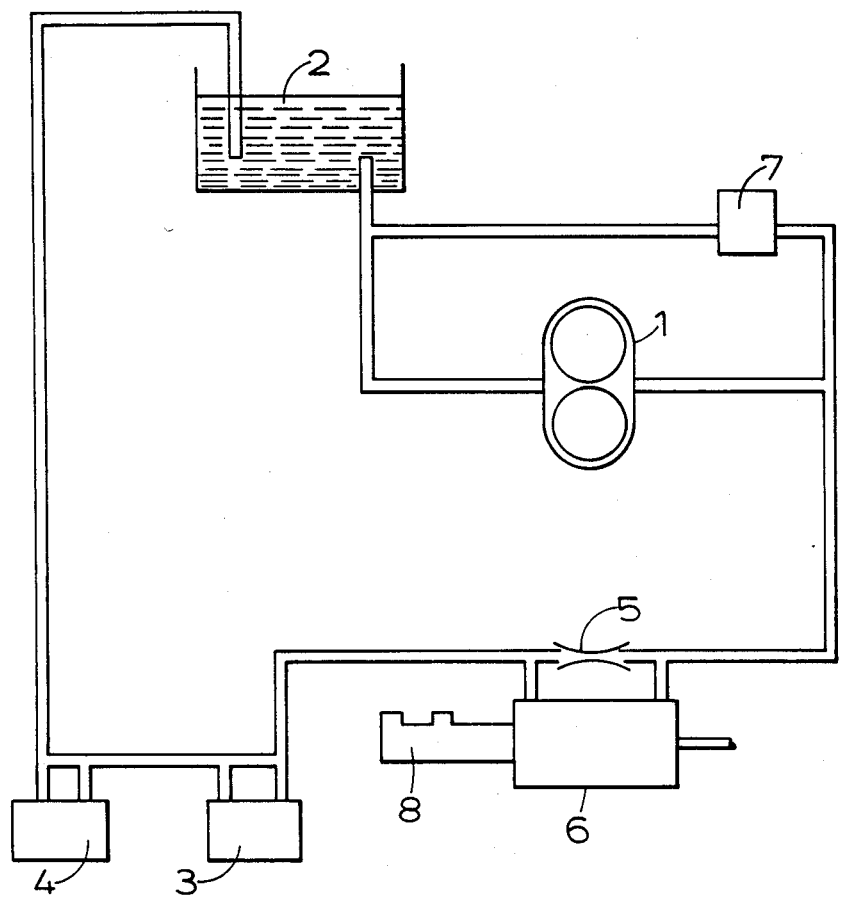
FIG. 1 shows an open centre vehicle hydraulic system in which hydraulic fluid for operating vehicle services is circulated continuously.

The system shown may conveniently be used in an agricultural vehicle, and comprises an engine-driven pump 1, which draws hydraulic fluid from a reservoir 2 and circulates it through a fixed restriction 5, a power steering unit 3, an implement unit 4, and back to the reservoir 2. The pressure differential generated across the fixed restriction 5 is used to operate a closed centre booster 6. The booster, which is shown in more detail in FIG. 2, operates a master cylinder 8 of the braking system (not shown) of the vehicle in response to operation of a pedal (not shown). The system also includes a pressure relief valve 7.

Figure 2:
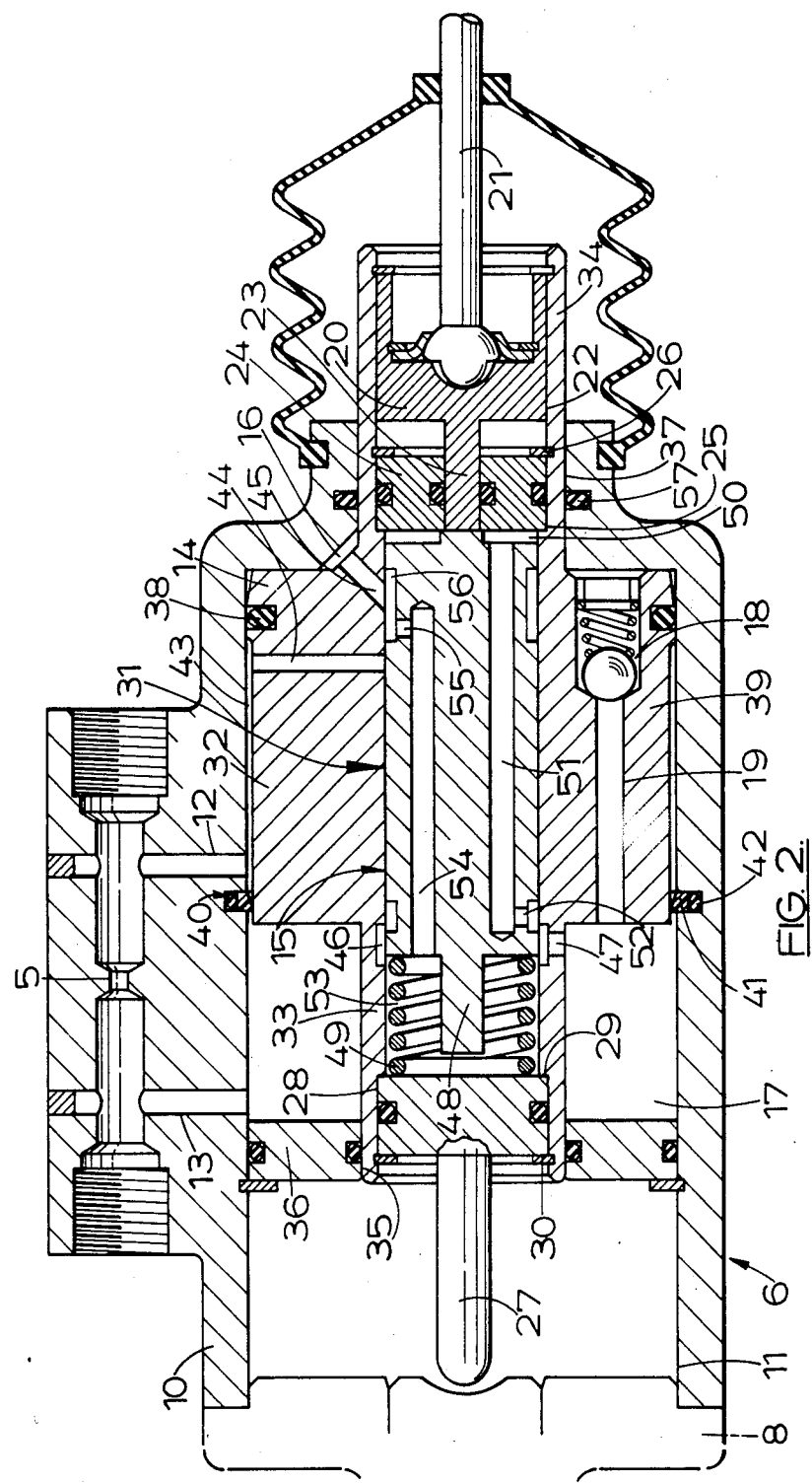
FIG. 2 is a longitudinal section through an hydraulic booster in accordance with the further aspect of our invention.

As seen in FIG. 2, the booster 6 has a housing 10 provided with a stepped longitudinal bore 11. The restriction 5 is formed in the housing 10, and an inlet 12 leads from the high pressure side of the restriction 5 to the bore 11, while an outlet 13 provides communication between the bore 11 and the low pressure side of the restriction 5. A stepped boost piston 14 works in the bore 11, and is itself provided with a stepped longitudinal bore 15. A boost chamber 16 is defined in the bore 11 behind the boost piston 14, and a forward chamber 17 is defined in the bore 11, forward of the boost piston 14, and in communication with the outlet 13. A one-way valve 18 is located in an axial passage 19 in the boost piston 14 connecting the forward and boost chambers. The valve 18 allows fluid flow from the forward chamber 17 to the boost chamber 16. An input piston 20, which is operated by a pedal-operated input rod 21, works in a rearward portion 22 of the boost piston bore 15, and has a forward extension 23 of reduced diameter working in a plug 24 sealingly located in the bore portion 22 between a step 25 in the bore 15 and a circlip 26. An output member 27 for actuating the master cylinder assembly 8 is sealingly located in a forward portion 28 of the bore 15 between a step 29 in the bore and a circlip 30. Control valve means 31 also works in the boost piston bore 15, and is operable to control pressurisation of the boost chamber 16 in response to movement of the input piston 20.

The boost piston 14 has a central portion 32 of larger diameter, and forward and rearward extensions 33, 34 respectively of reduced diameter. In fact, the diameters of the extensions are substantially equal. The forward extension 33 works in an aperture 35 in a plug 36 sealingly fixed in the bore 11, while the rearward extension 34 works in a portion 37 of the bore 11 of smaller diameter. The central portion 32 carries a seal 38 which works in the bore 11, and has a reduced diameter portion 39 which works through a seal 40 located in the bore 11. The seal 40 comprises a polytetrafluoroethylene (P.T.F.E.) sealing ring 41 backed by an O-ring 42. This seal has a tolerance to radial clearances, so it can seal against the reduced diameter portion 39 reliably. Use of the seal 40 simplifies construction and assembly of the booster. The reduced diameter portion 39 defines an annulus connected to the inlet 12, and the annulus comprises a high pressure chamber 43. The pressure in chamber 43 acts to bias the boost piston 14 rearwardly. The seal 40 divides the high pressure chamber 43 from the forward chamber 17, while the seal 38 divides the high pressure chamber 43 from the boost chamber 16. The rear of the boost chamber 16 is sealed by a seal 57 located in the housing.

A radial passage 44 leads from the high pressure chamber 43 to the boost piston bore 15, and an inclined passage 45 leads from the boost piston bore 15 to the boost chamber 16. An annulus 46 in the bore 15 communicates with the forward chamber 17 through a radial passage 47 in the forward extension 33. The control valve means 31 comprises a spool 48 working in the bore 15, and biassed rearwardly by a spring 49 which works between the spool 48 and the outlet member 27.

A chamber 50 at the rearward end of the spool 48 is in communication with the forward chamber 17 by means of an axial blind bore 51 and a radial passage 52 in the spool 48, and the annulus 46 and passage 47. A chamber 53 at the forward end of the spool 48 is connected to the boost chamber 16 through a second axial blind bore 54, a radial passage 55 and an annulus 56 in the spool 48, and the inclined passage 45.

In the inoperative position shown all the parts of the booster are in their retracted positions, with the boost chamber 16 connected to the outlet 13 through the chamber 53, so that the booster is suspended at low pressure. The system as a whole operates to circulate fluid to provide the power for operating the various open centre services in a known manner. The fixed restriction 5 provides a pressure differential of about 7 bars for operating the closed centre booster 6.

When the booster 6 is to be operated, movement of the pedal is transmitted to the input piston 20, which acts on the spool 48 against the force in the spring 49. Movement of the spool 48 firstly cuts off communication between the chamber 53 and the annulus 46, which cuts off the chamber 53, and thus the boost chamber 16 from the outlet 13. Further movement of the spool 48 opens communication between the passage 44 and the annulus 56, allowing fluid from the high pressure chamber 43 into the boost chamber 16, and to the chamber 53. Pressurisation of the boost chamber 16 advances the boost piston 14 in the bore 11 to actuate the master cylinder.

This movement of the boost piston 14 expels fluid from the forward chamber 17 to the outlet 13 and back into the system. It will be appreciated that, because of the relative areas of the boost and forward chambers 16 and 17, the volume of fluid at high pressure admitted to the boost chamber 16 will cause an equal volume of fluid at low pressure to be returned to the system from the forward chamber 17. This minimises the fluid consumption of the booster, and the effect of the system of its operation.

The boost pressure which is present in the chamber 53 acts on the spool 48 to provide a reaction force which is transmitted back to the pedal via the spool 48, the input piston 20 and the input rod 21 to provide "feel" for the operator. The booster is therefore input reactive. When the reaction force on the spool 48 equals the applied load from the pedal the boost piston 14 moves forward relative to the spool 48, cutting off communication between the passage 44 and the annulus 56. The booster is then in its equilibrium position.

If the load on the pedal is reduced, the spring 49 moves the spool 48 rearwardly, to re-establish communication between the annulus 46 and the chamber 53, thus connecting the boost chamber 16 to the outlet 13. The boost pressure is therefore reduced, so that the boost piston 14 and the spool 48 move rearwardly. If the load on the pedal has not been wholly removed, the booster will take up a new equilibrium position, and if it has been wholly removed, the booster will return to the retracted position shown.

The one-way valve 18 will remain closed during operation of the booster as long as the pressure in the boost chamber 16 is greater than that in the forward chamber 17. However, if the pressure in the forward chamber 17 exceeds that in the boost chamber 16 the one-way valve 18 opens, to allow fluid to flow from the forward chamber 17 to the boost chamber 16 through the passage 19. This situation may occur if the booster is operated very rapidly, particularly when the source of pressure fails, or is reduced, so that the booster is operated manually, with the spool 48 providing a direct mechanical force-transmitting connection between the input and output members. The one-way valve 18 thus avoids the adverse effect on the operation of the booster that excess pressure in the forward chamber 17 would otherwise have. This feature is particularly useful when the source of pressure in unreliable, or, as in the system shown in FIG. 1, provides only a relatively small volumetric flow which may not always be sufficient to operate the booster. Clearly, this feature means that the booster could advantageously be used in other systems.

However, the booster of FIG. 2 has other features which are advantageous when it is incorporated in an open centre hydraulic system. The arrangement of the fixed restriction 5 in the housing, and the arrangement of the forward and boost chambers such that the volume of fluid entering the booster is equal to the volume of fluid displaced enable the pump capacity, and the effect of booster operation on the other services to be minimised. This is particularly useful if a booster is to be incorporated into an existing system, as the system does not need modifying. However, in the booster of FIG. 2 the fixed restriction 5 generates the pressure differential as long as the pump 1 is operating, regardless of whether or not the booster is being operated. This results in heat being generated at the restriction, and it must be ensured that the system is able to dissipate the heat.

Figure 3:
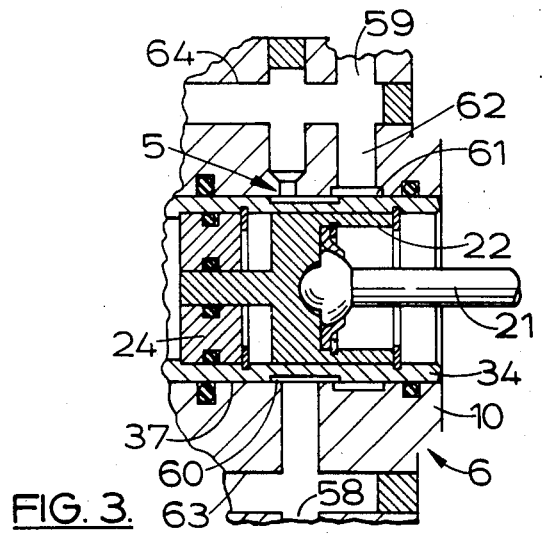
FIG. 3 is a fragmentary section through the booster of FIG. 2, showing a modification.

The modification of FIG. 3 shows a method of overcoming this disadvantage. FIG. 3 shows the rearward portion of the booster, with bore portion 37, the rearward extension 34 of the boost piston 14, together with the input rod 21 and the input piston 22. The restriction 5 is defined in the rearward portion of the booster. Fluid from the pump 1 enters the booster through a radial inlet passage 58 and leaves through a radial outlet passage 59. The inlet passage 58 leads to the bore portion 37, and communicates with an annulus 60 in the boost piston 14. The annulus 60 communicates with the outlet passage 59 through the restriction 5, and through an annulus 61 formed in the housing, and a passage 62 parallel to the restriction 5. In the inoperative position shown the annulus 60 is in communication with the annulus 61, but movement of the boost piston 14 can cut off this communication. Axial passages 63, 64 in the housing lead to the booster inlet and outlet 12, 13, respectively. One further modification (not shown) is that the clearance between the forward end of the spool 48 and the output member 27 may be reduced. The remainder of the construction of the booster is similar to that shown in FIG. 2.

In the inoperative position shown, fluid from the pump 1 enters through the inlet passage 58 and the annulus 60, and passes to the outlet 59 through the restriction 5 and also through the annulus 61 and the passage 62. The restriction 5 therefore is unable to generate any substantial pressure differential.

When the booster is operated, initial movement of the input piston 22 acts on the spool 48, cutting off the boost chamber 16 from the outlet 13, and putting it in communication with the inlet 12. As there is at this point substantially no pressure differential, there will be no pressure generated in the boost chamber 16. However, further movement of the input piston 22 causes the spool 48 to engage with the output member 27. This causes movement of the boost piston 14, which cuts off the annulus 61 from the annulus 60. All fluid flow from the pump 1 thus has to pass through the restriction 5, which generates a pressure differential to operate the booster. The remainder of the booster operation is the same as that described in relation to FIG. 2.

The modification of FIG. 3 therefore provides the pressure differential for operating the booster only when necessary, which reduces the heat generated by the system.

I claim:

1. An open centre vehicle hydraulic system including vehicle services, a pump for circulating hydraulic fluid continuously to operate said vehicle services, a fixed restriction through which fluid is passed to generate a pressure differential, and a closed centre booster operated by said pressure differential generated by said fixed restriction, said booster comprising a housing having an inlet connected to the higher pressure side of said fixed restriction, an outlet connected to the lower pressure side of said fixed restriction and a bore in which a boost piston works, means defining a boost chamber in said bore behind said boost piston, and a control valve means controlling pressurisation of said boost chamber in response to an input load, said control valve means controlling communication between said boost chamber and said inlet, and between said boost chamber and said outlet, and having three operating positions, a first position in which said boost chamber is connected to said outlet and cut off from said inlet, a second position in which said boost chamber is connected to said inlet and cut off from said outlet, and a third position in which said boost chamber is isolated from said inlet and said outlet; and when said booster is inoperative said control valve means is in said first position so that there is no fluid flow to said booster, and on initial operation of said booster said control valve means moves to said second position so that fluid flow from the inlet pressurises said boost chamber to advance said boost piston in said bore.

2. An open centre vehicle hydraulic system as claimed in claim 1, wherein said fixed restriction is incorporated in said booster.

3. An open centre vehicle hydraulic system as claimed in claim 1, wherein said fixed restriction is operative to generate said pressure differential as long as said pump is operative.

4. An open centre vehicle hydraulic system as claimed in claim 1, wherein said fixed restriction is operative to generate said pressure differential only when said booster is operative.

5. An open centre vehicle hydraulic system as claimed in claim 4, wherein said booster has an input piston, said booster being operated in response to movement of said input piston, and fixed restriction is operative in response to movement of said input piston.

6. An open centre vehicle hydraulic system as claimed in claim 1, wherein said booster is constructed and arranged so that in operation a volume of fluid at a higher pressure entering said booster from said system causes an equal volume of fluid at a lower pressure to leave said booster and return to said system.

* * * * *